(12) United States Patent
Yamamoto et al.

(10) Patent No.: US 12,009,571 B2
(45) Date of Patent: Jun. 11, 2024

(54) WINDOW GLASS FOR VEHICLE

(71) Applicant: AGC Inc., Tokyo (JP)

(72) Inventors: Tsuyoshi Yamamoto, Tokyo (JP);
Satoshi Tokunaga, Tokyo (JP); Haruto Sanda, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/877,403

(22) Filed: Jul. 29, 2022

(65) Prior Publication Data

US 2023/0045425 A1 Feb. 9, 2023

(30) Foreign Application Priority Data

Aug. 4, 2021 (JP) ................................. 2021-128375

(51) Int. Cl.
*H01Q 1/12* (2006.01)
*B60J 1/00* (2006.01)
*H01Q 1/32* (2006.01)

(52) U.S. Cl.
CPC ............ *H01Q 1/1278* (2013.01); *B60J 1/002* (2013.01); *H01Q 1/3208* (2013.01)

(58) Field of Classification Search
CPC ...... H01Q 1/1278; H01Q 1/3208; B60J 1/002
See application file for complete search history.

(56) References Cited

U.S. PATENT DOCUMENTS

| | | | | |
|---|---|---|---|---|
| 4,247,954 A | * | 1/1981 | Sauer | H01Q 1/1271 330/281 |
| 4,608,570 A | * | 8/1986 | Inaba | H01Q 1/1278 219/203 |
| 4,850,037 A | * | 7/1989 | Bochmann | H04B 7/0851 455/137 |
| 5,231,410 A | * | 7/1993 | Murakami | H01Q 1/1278 343/704 |
| 5,334,989 A | * | 8/1994 | Nagayama | H01Q 1/1271 343/704 |
| 5,416,491 A | * | 5/1995 | Nishikawa | H01Q 1/1271 343/704 |
| 5,428,830 A | * | 6/1995 | Zerod | H04B 1/18 455/345 |

(Continued)

FOREIGN PATENT DOCUMENTS

JP 2021-010086 A 1/2021

*Primary Examiner* — Ricardo I Magallanes
*Assistant Examiner* — Jordan E. DeWitt
(74) *Attorney, Agent, or Firm* — Foley & Lardner LLP

(57) ABSTRACT

The present invention relates to a window glass for vehicle, which includes a glass plate and an antenna provided to the glass plate and capable of receiving electromagnetic waves of AM broadcasting and FM broadcasting, in which the antenna includes an antenna element and a feeding portion electrically connected to the antenna element, the antenna element lies at a distance of longer than 20 mm from a metallic portion of the vehicle in a vehicle-mounted state, the antenna element includes at least one horizontal portion extending in an approximately horizontal direction in the vehicle-mounted state, the horizontal portion has an open end or has a bent portion bending apart therefrom which has an open end, and the horizontal portion has a total element length that is at least 3/4 of an overall length of the antenna element.

14 Claims, 13 Drawing Sheets

(56) References Cited

U.S. PATENT DOCUMENTS

| | | | | |
|---|---|---|---|---|
| 5,461,391 | A * | 10/1995 | Ohnishi | H01Q 1/1278 343/704 |
| 5,610,619 | A * | 3/1997 | Zafar | H01Q 1/1278 343/860 |
| 6,008,767 | A * | 12/1999 | Taniguchi | H01Q 1/1278 343/711 |
| 6,121,934 | A * | 9/2000 | Taniguchi | H01Q 1/1278 343/704 |
| 6,307,516 | B1 * | 10/2001 | Zafar | H01Q 1/1278 343/704 |
| 7,019,700 | B2 * | 3/2006 | Fujii | H01Q 1/1278 343/713 |
| 7,227,503 | B2 * | 6/2007 | Baba | H01Q 1/1278 343/711 |
| 8,334,813 | B2 * | 12/2012 | Tadokoro | H01Q 1/325 343/704 |
| 2001/0009408 | A1 * | 7/2001 | Nagayama | H01Q 1/1278 343/897 |
| 2002/0171600 | A1 * | 11/2002 | Lindenmeier | H01Q 1/1278 343/850 |
| 2005/0030235 | A1 * | 2/2005 | Noguchi | H01Q 1/1278 343/704 |
| 2007/0273597 | A1 * | 11/2007 | Noda | H01Q 1/1271 343/704 |
| 2010/0328170 | A1 * | 12/2010 | Kuehne | H01Q 1/1278 343/712 |
| 2011/0032163 | A1 * | 2/2011 | Noguchi | H01Q 1/32 343/711 |
| 2011/0037668 | A1 * | 2/2011 | Mukai | H01Q 1/1271 343/712 |
| 2011/0043419 | A1 * | 2/2011 | Noguchi | H01Q 1/1278 343/712 |
| 2011/0115681 | A1 * | 5/2011 | Oshima | H01Q 5/40 343/713 |
| 2012/0249382 | A1 * | 10/2012 | Tadokoro | H01Q 5/40 343/713 |
| 2016/0359219 | A1 * | 12/2016 | Araki | H01Q 1/1278 |
| 2017/0279182 | A1 * | 9/2017 | Hayashi | H01Q 1/1278 |
| 2018/0123219 | A1 * | 5/2018 | Doi | H01Q 1/325 |
| 2018/0233803 | A1 * | 8/2018 | Nakano | H01Q 1/1278 |
| 2019/0097671 | A1 * | 3/2019 | Dimpflmaier | H03F 3/19 |
| 2019/0190117 | A1 * | 6/2019 | Morishita | B60J 1/00 |
| 2020/0411947 | A1 * | 12/2020 | Saito | B60J 5/102 |
| 2021/0249754 | A1 * | 8/2021 | Tokuda | H01Q 5/335 |
| 2021/0257712 | A1 * | 8/2021 | Tokuda | B60R 11/02 |
| 2022/0311123 | A1 * | 9/2022 | Mamuro | H01Q 1/02 |
| 2023/0045425 | A1 * | 2/2023 | Yamamoto | H01Q 1/1271 |

* cited by examiner

WINDOW GLASS FOR VEHICLE

CROSS-REFERENCE TO RELATED APPLICATIONS

This application is based on and claims priority under 35 USC 119 from Japanese Patent Application No. 2021-128375 filed on Aug. 4, 2021, the contents of which are incorporated herein by reference.

TECHNICAL FIELD

The present invention relates to a window glass for vehicle.

BACKGROUND ART

Various functional members including defoggers and antennas are disposed in window glasses for vehicle so long as the visibility can be ensured. However, the disposition of these functional members is sometimes restricted, depending on the kind of vehicle, by the smallness of the size (area) of the window glass, or the like. For example, ensuring an area for disposing a defogger may make it difficult to ensure an area for disposing a frequency antenna for receiving both an AM broadcast wave and an FM broadcast wave. Known as such a frequency antenna for receiving both the AM broadcast wave and the FM broadcast wave is an antenna having a rectangular looped element connected to one feeding portion (see, e.g., FIG. 4 of Patent Document 1).

Patent Document 1: JP-A-2021-010086

SUMMARY OF INVENTION

However, in some kinds of window glasses, it is difficult to ensure an area for disposing a rectangular looped element having four sides.

The present invention provides a window glass for vehicle equipped with a simple antenna capable of receiving the AM broadcast wave and the FM broadcast wave.

The present invention provides a window glass for vehicle, which includes
a glass plate and
an antenna provided to the glass plate and capable of receiving electromagnetic waves of AM broadcasting and FM broadcasting, in which
the antenna includes an antenna element and a feeding portion electrically connected to the antenna element,
the antenna element lies at a distance of longer than 20 mm from a metallic portion of the vehicle when the glass plate is in a vehicle-mounted state where the glass plate has been attached to a vehicle,
the antenna element includes at least one horizontal portion extending in an approximately horizontal direction in the vehicle-mounted state,
the horizontal portion has an open end or has a bent portion bending apart therefrom which has an open end, and
the horizontal portion has a total element length that is at least ¾ of an overall length of the antenna element.

The present invention can provide a window glass for vehicle which is equipped with a simple antenna capable of receiving an AM broadcast wave and an FM broadcast wave.

DESCRIPTION OF EMBODIMENTS

Embodiments of the present invention are explained below with reference to drawings. For easy understanding, there are cases where the scales of portions in each drawing differ from actual ones. The directions such as parallel, perpendicular, orthogonal, horizontal, vertical, upside/downside, and right-hand/left-hand directions are allowed to deviate to such a degree as not to lessen the effects of the embodiments. The shape of each corner is not limited to a perpendicular shape, and may be rounded in a bow shape. The terms "X-axis direction", "Y-axis direction", and "Z-axis direction" respectively mean a direction parallel with the X axis, a direction parallel with the Y axis, and a direction parallel with the Z axis. The X-axis direction, the Y-axis direction, and the Z-axis direction are orthogonal to each other. The terms "XY plane", "YZ plane", and "ZX plane" respectively mean a virtual plane parallel with both the X-axis direction and the Y-axis direction, a virtual plane parallel with both the Y-axis direction and the Z-axis direction, and a virtual plane parallel with both the Z-axis direction and the X-axis direction.

Examples of the window glass for vehicle according to the present invention include a rear window glass to be attached to a rear portion of a vehicle, a windshield to be attached to a front portion of a vehicle, a side window glass to be attached to a lateral side of a vehicle, and a roof glass to be attached to the ceiling of a vehicle. The window glass for vehicle is not limited to these examples.

Figure 1:
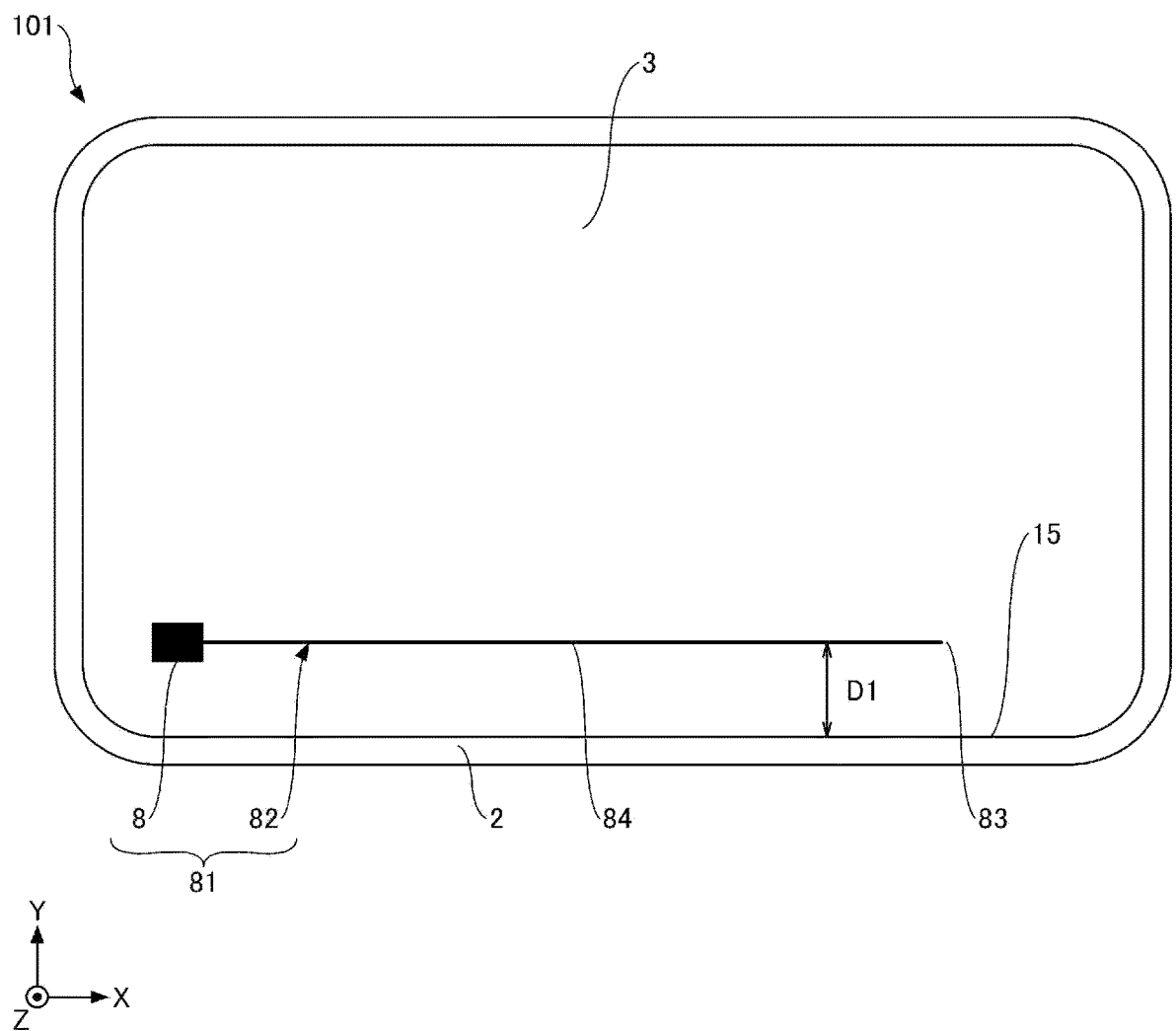
FIG. 1 is a plan view illustrating a configuration example of a window glass for vehicle according to a first embodiment.

FIG. 1 is a plan view illustrating a configuration example of a window glass for vehicle according to a first embodiment. The window glass 101 illustrated in FIG. 1 has been attached to a window frame 2 which is a portion of a vehicle. In FIG. 1, the window glass 101 attached to the window frame 2 is illustrated in the state of being viewed from the inside of the vehicle. In illustrating the window glass 101 in the state of having been attached to the window frame 2, the positive side of the Z-axis direction indicates the inside of the vehicle and the negative side of the Z-axis direction indicates the outside of the vehicle.

The window frame 2 has an electroconductive metallic portion 15 which can be grounded, and is also called a flange. A part of the window frame 2 may be the metallic portion 15, or the entire window frame 2 may be the metallic portion 15. The window frame 2 has a frame edge, which forms an opening covered with the window glass 101. Although FIG. 1 illustrates an approximately rectangular frame edge as an example, the frame edge may have another shape such as an approximately square shape. The frame edge is the inner edge of the window frame 2.

The window glass 101 is an example of the window glass for vehicle. The window glass 101 may be a single-sheet window glass or may be a laminated glass composed of a plurality of superposed glass sheets. The term "single-sheet window glass" means a window glass containing only one sheet of glass plate (glass plate 3 in this example) as a constituting glass plate. The glass plate may be an unstrengthened glass obtained by forming a molten glass into a plate shape and annealing the formed glass. The glass plate may be one which has undergone a strengthening treatment such as physical strengthening (e.g., strengthening by air chilling) or chemical strengthening, according to need.

The window glass 101 includes the glass plate 3 and an antenna 81 as main components.

The glass plate 3 is a plate-shaped dielectric having a first main surface, which faces the positive side of the Z-axis direction, and a second main surface, which faces the side opposite from the first main surface in the Z-axis direction (i.e., on the negative side of the Z-axis direction). The glass plate 3 may be transparent or translucent. The first main surface is a surface facing the inside of the vehicle, and the second main surface is a surface facing the outside of the vehicle. The glass plate 3 has been attached to the window frame 2 so that the periphery of the glass plate 3 overlaps the window frame 2 in a plan view from the inside of the vehicle.

The antenna 81 is a conductor provided to the glass plate 3. A part or whole of the antenna 81 may be disposed on a surface (e.g., the first main surface) of the glass plate 3, or may be disposed inside the glass plate in the case where the glass plate 3 is a laminated glass.

The antenna 81 is an antenna formed so as to be capable of receiving electromagnetic waves of AM broadcasting and FM broadcasting. An AM broadcast wave band is a frequency band included in the range of, for example, 500-1,500 kHz. An FM broadcast wave band is a frequency band included in the range of, for example, 76-108 MHz, but may be a frequency band included in the range of 76-90 MHz (as in, e.g., Japan) or a frequency band included in the range of 88-108 MHz (as in, e.g., North America).

The antenna 81 includes: an antenna element 82 and a feeding portion 8 electrically connected to the antenna element 82. When the glass plate 3 is in a vehicle-mounted state (hereinafter referred to also as "vehicle-mounted state C"), the antenna element 82 lies at a distance of longer than 20 mm from the metallic portion 15 of the vehicle. The vehicle-mounted state C in this example is a state in which the glass plate 3 has been attached to the window frame 2.

Since the antenna element 82, in the vehicle-mounted state C, lies at a distance of longer than 20 mm from the metallic portion 15, the antenna element 82 shows lessened or no capacitive coupling with the metallic portion 15. Hence, AM broadcast wave signals which the antenna 81 has received are suppressed from leaking out to the metallic portion 15, resulting in an improvement in the antenna gain of the antenna 81 in the AM broadcast wave band. In addition, vehicle noises having frequencies in the AM broadcast wave band can be suppressed from coming into the antenna 81 via the metallic portion 15. In the example illustrated in FIG. 1, the distance D1 between a horizontal portion 84 of the antenna element 82 and the metallic portion 15, in the vehicle-mounted state C, is longer than 20 mm.

The distance D1 is preferably 25 mm or longer, more preferably 30 mm or longer, still more preferably 35 mm or longer, and especially preferably 40 mm or longer, from the standpoint of improving the antenna gain of the antenna 81 in the AM broadcast wave band. There is no particular upper limit on the distance D1 so long as areas for disposing functional members such as a defogger, and the antenna 81 can be ensured. For example, the distance D1 is 100 mm or less.

In the example illustrated in FIG. 1, the antenna element 82 does not overlap the metallic portion 15 in a plan view in the Z-axis direction. However, so long as the distance D1 is longer than 20 mm, at least a part of the antenna element 82 may overlap at least a part of the metallic portion 15 in a plan view in the Z-axis direction. That is, in the case where the plane of the glass plate 3 is taken as an XY plane and the metallic portion 15 is separated from the XY plane in the Z-axis direction at a distance longer than 0 mm, then the distance D1 between the antenna element 82 and the metallic portion 15 can be defined with a Y-axis-direction component and a Z-axis-direction component.

The antenna element 82 includes at least one horizontal portion which extends approximately horizontally in the vehicle-mounted state C. FIG. 1 exemplifies one horizontal portion 84, which has an open end 83. The horizontal portion 84 linearly extends approximately horizontally, in the vehicle-mounted state C, from the feeding portion 8 to the open end 83.

The feeding portion 8 is a feeding point for the antenna element 82 and is, for example, an electrode for feeding the antenna element 82. The feeding portion 8 is disposed near the periphery of the glass plate 3 so as to lie near the window frame 2, in the vehicle-mounted state C. The feeding portion 8 is electrically connected to one end of a feeding wire (not illustrated) or to the input terminal of an amplifier (not illustrated). The other end of the feeding wire or the output terminal of the amplifier is connected, for example, to a receiver (not illustrated) for receiving AM broadcast and FM broadcast waves. Examples of the feeding wire include an audio-and-video wire (AV wire), a coaxial cable, and the like.

The feeding portion 8 preferably has a shape such as a quadrilateral shape, e.g., a square, approximately square, rectangular, or approximately rectangular shape, or a polygonal shape, from the standpoint of mounting a connector, an amplifier or the like on the feeding portion 8. However, the shape of the feeding portion 8 is not limited to these, and may be any of other shapes such as round shapes, e.g., circular, approximately circular, elliptic, and approximately elliptic shapes.

In the case where the horizontal portion 84 has a total element length which is at least ¾ of the overall length L of the antenna element 82, the antenna 81 has a simple shape elongated approximately horizontally. This makes it easy to ensure an area for disposing the antenna 81, which is for receiving electromagnetic waves of AM broadcasting and FM broadcasting, on the glass plate 3 even in the case where the glass plate 3 has functional members such as a defogger, disposed thereon. In the example illustrated in FIG. 1, the overall length L of the antenna element 82 corresponds to the element length ranging from the feeding portion 8 to the open end 83.

The total element length of the horizontal portion 84 is preferably at least ⅘, more preferably at least ⅚ still more preferably at least 6/7, of the overall length L of the antenna element 82, from the standpoint of improving the antenna gain of the antenna 81 in the AM broadcast wave band and the FM broadcast wave band. In the example illustrated in FIG. 1, the total element length of the horizontal portion 84 is equal to the overall length L of the antenna element 82.

In the example illustrated in FIG. 1, since the antenna element 82 is a linear element having one open end, advantageous effects are obtained in which the antenna 81 is simplified and it is easy to ensure an area for disposing the antenna 81. The antenna element 82 may branch at one or more portions, and may have two or more open ends.

Now, let $\lambda_0$ represent a wavelength in the FM broadcast wave frequency band in air, and let k represent a wavelength shortening ratio of the glass plate 3. In the case where the overall length L of the antenna element 82 is $0.38\times(\lambda_0/4)\times k$ or longer and $1.92\times(\lambda_0/4)\times k$ or shorter, the antenna 81 has an improved antenna gain in the FM broadcast wave band. From the standpoint of improving the antenna gain of the antenna 81 in the FM broadcast wave band, the overall length L is preferably $0.47\times(\lambda_0/4)\times k$ or longer and $1.72\times(\lambda_0/4)\times k$ or shorter, and more preferably $0.57\times(\lambda_0/4)\times k$ or longer and $1.62\times(\lambda_0/4)\times k$ or shorter. Although the wavelength $\lambda_0$ may be any wavelength in the FM broadcast wave frequency band in air, it may be the wavelength (center wavelength) at the center (center frequency) of the FM broadcast wave frequency band.

In the case where the overall length L of the antenna element 82 is 200 mm or longer and 1,000 mm or shorter, the antenna 81 has an improved antenna gain in the FM broadcast wave band. From the standpoint of improving the antenna gain of the antenna 81 in the FM broadcast wave band, the lower limit of the overall length L of the antenna element 82 is preferably 250 mm or longer and more preferably 300 mm or longer. From the standpoints of improving the antenna gain of the antenna 81 in the FM broadcast wave band and of reducing the size of the antenna 81, the upper limit of the overall length L of the antenna element 82 is preferably 1,000 mm or shorter, more preferably 950 mm or shorter, still more preferably 900 mm or shorter, and especially preferably 850 mm or shorter.

In the case where the capacity of the antenna element 82 in the frequency range of 500 kHz to 1,500 kHz is 5 pF or higher and 30 pF or lower, an antenna gain of the antenna 81 in the AM broadcast wave band can be ensured and at the same time, the antenna 81 can be made to have a reduced size. From the standpoint of improving the antenna gain of the antenna 81 in the AM broadcast wave band, the capacity of the antenna element 82 is preferably 7 pF or higher, more preferably 9 pF or higher, and still more preferably 11 pF or higher. From the standpoint of reducing the size of the antenna 81, the capacity of the antenna element 82 is preferably 28 pF or lower, more preferably 26 pF or lower, and still more preferably 24 pF or lower.

The antenna gain of the antenna 81 in the AM broadcast wave band may be increased by heightening the gain of the amplifier connected to the feeding portion 8. For example, while the antenna 81 having a capacity of 10 pF or higher and 30 pF or lower at 500 kHz to 1,500 kHz is kept connected to the input-side terminal of the amplifier, the gain of the amplifier is regulated so as to obtain given amplification characteristics (gain). The combinational use of an amplifier having the thus-regulated gain with the antenna 81 can ensure an antenna gain in the AM broadcast wave band even with a simple antenna pattern disposed in a relatively narrow area in the glass plate 3.

In the example illustrated in FIG. 1, since the antenna element 82 is a straight-line element extending linearly approximately horizontally in the vehicle-mounted state C, advantageous effects are obtained in which the antenna 81 can be simplified and it is easy to ensure an area for disposing the antenna 81. However, the antenna element 82 is not limited to a straight-line element extending linearly approximately horizontally in the vehicle-mounted state C, and may be any of the following modification examples.

Figure 2:
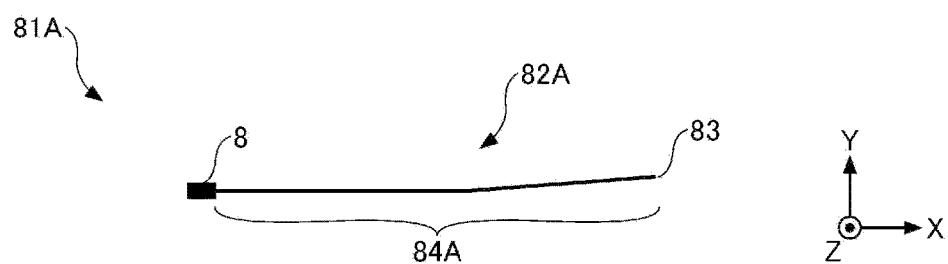
FIG. 2 is a plan view illustrating a first modification example of an antenna element.

FIG. 2 is a plan view illustrating a first modification example of the antenna element. The antenna 81A illustrated in FIG. 2 is a modification example of the antenna 81. With respect to the antenna 81A, explanations on configurations and effects which are similar to those of the antenna 81 are omitted by quoting the explanations given above. The same applies to the other modification examples described later.

The antenna 81A includes a bent antenna element 82A. The antenna element 82A includes one horizontal portion 84A which extends approximately horizontally in the vehicle-mounted state C. The horizontal portion 84A is slightly bent at an intermediate portion between the feeding portion 8 and the open end 83 but, as whole, extends approximately horizontally in the vehicle-mounted state C. Although the horizontal portion 84A in the example illustrated in FIG. 2 is slightly bent to the positive side of the Y-axis direction, it may be slightly bent to the negative side of the Y-axis direction. The angle at which the horizontal portion 84A is slightly bent is not particularly limited, and the angle may be, for example, in the range of from larger than 0° and 30° or smaller (in terms of absolute value; the same applies hereinafter), in the range of from larger than 0° and 20° or smaller, in the range of from larger than 0° and 10° or smaller, or in the range of from larger than 0° and 5° or smaller, with respect to the X-axis direction.

Figure 3:
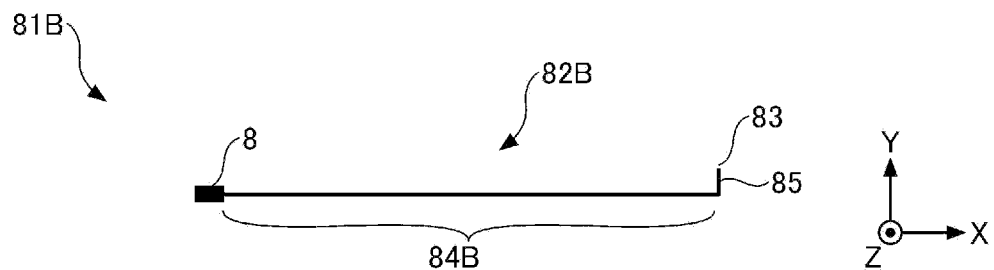
FIG. 3 is a plan view illustrating a second modification example of the antenna element.

FIG. 3 is a plan view illustrating a second modification example of the antenna element. The antenna 81B illustrated in FIG. 3 is a modification example of the antenna 81. The antenna 81B includes a bent antenna element 82B.

The antenna element 82B includes one horizontal portion 84B, which extends approximately horizontally in the vehicle-mounted state C, and one vertical portion 85, which extends approximately vertically in the vehicle-mounted state C. The open end 83 is the end of the vertical portion 85 that is a portion that bends apart from the horizontal portion 84B. The vertical portion 85 extends from the end of the horizontal portion 84B to the open end 83. Although the vertical portion 85 in the example illustrated in FIG. 3 bends apart from the horizontal portion 84B to the positive side of the Y-axis direction, it may bend apart from the horizontal portion 84B to the negative side of the Y-axis direction. The state in which the vertical portion 85 "extends approximately vertically" is not particularly limited, and the angle may be, for example, in the range of 0° to 30° (in terms of absolute value; the same applies hereinafter), in the range of 0° to 20°, in the range of 0° to 10°, or in the range of 0° to 5°, with respect to the Y-axis direction.

Figure 4:
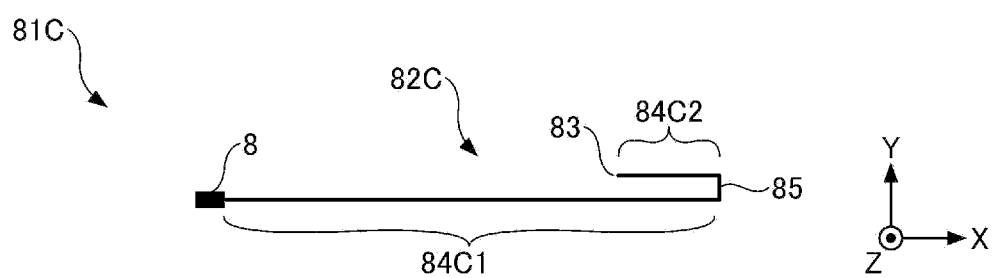
FIG. 4 is a plan view illustrating a third modification example of the antenna element.

FIG. 4 is a plan view illustrating a third modification example of the antenna element. The antenna 81C illustrated in FIG. 4 is a modification example of the antenna 81. The antenna 81C includes an antenna element 82C which are bent in a plurality of portions.

The antenna element 82C includes two horizontal portions 84C1 and 84C2, which extend approximately horizontally in the vehicle-mounted state C, and one vertical portion 85, which extends approximately vertically in the vehicle-mounted state C. The open end 83 is the end of a return portion that bends apart from the horizontal portion 84C1. The return portion includes one vertical portion 85, which extends approximately vertically in the vehicle-mounted state C, and one horizontal portion 84C2, which extends approximately horizontally in the vehicle-mounted state C. The vertical portion 85 extends from the end of the horizontal portion 84C1 to the starting point of the horizontal portion 84C2. The horizontal portion 84C2 extends from the connecting point between itself and the vertical portion 85 to the open end 83. The return portion connected to the horizontal portion 84C1, in the example illustrated in FIG. 4, turns back after bending apart from the horizontal portion 84C1 to the positive side of the Y-axis direction. However, the return portion may turn back after bending apart from the horizontal portion 84C1 to the negative side of the Y-axis direction. The state in which the horizontal portion 84C1 or 84C2 "extends approximately horizontally" is not particularly limited, and the angle may be, for example, in the range of 0° to 30° (in terms of absolute value; the same applies hereinafter), in the range of 0° to 20°, in the range of 0° to 10°, or in the range of 0° to 5°, with respect to the X-axis direction.

Figure 5:
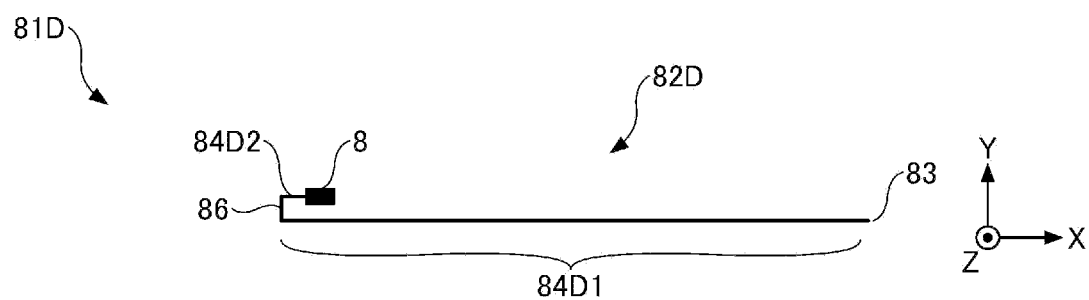
FIG. 5 is a plan view illustrating a fourth modification example of the antenna element.

FIG. 5 is a plan view illustrating a fourth modification example of the antenna element. The antenna 81D illustrated in FIG. 5 is a modification example of the antenna 81. The antenna 81D includes an antenna element 82D which is bent in a plurality of portions.

The antenna element 82D includes two horizontal portions 84D1 and 84D2, which extend approximately horizontally in the vehicle-mounted state C, and one vertical portion 86, which extends approximately vertically in the vehicle-mounted state C. The open end 83 is the end of the horizontal portion 84D1. The horizontal portion 84D2 extends from the feeding portion 8 to the vertical portion 86 to the negative side of the X-axis direction. The return portion bending apart from the horizontal portion 84D2 includes one vertical portion 86, which extends approximately vertically in the vehicle-mounted state C, and one horizontal portion 84D1, which extends approximately horizontally in the vehicle-mounted state C. The vertical portion 86 extends from the connecting point between itself and the horizontal portion 84D2 to the horizontal portion 84D1 to the negative side of the Y-axis direction. The horizontal portion 84D1 extends from the connecting point between itself and the vertical portion 86 to the open end 83 to the positive side of the X-axis direction. The return portion connected to the horizontal portion 84D2, in the example illustrated in FIG. 5, turns back after bending apart from the horizontal portion 84D2 to the negative side of the Y-axis direction. However, the return portion may turn back after bending apart from the horizontal portion 84D2 to the positive side of the Y-axis direction.

The state in which the horizontal portion 84D1 or 84D2 "extends approximately horizontally" is not particularly limited, and the angle may be, for example, in the range of 0° to 30° (in terms of absolute value; the same applies hereinafter), in the range of 0° to 20°, in the range of 0° to 10°, or in the range of 0° to 5°, with respect to the X-axis direction. Furthermore, the state in which the vertical portion 86 "extends approximately vertically" is not particularly limited, and the angle may be, for example, in the range of 0° to 30° (in terms of absolute value; the same applies hereinafter), in the range of 0° to 20°, in the range of 0° to 10°, or in the range of 0° to 5°, with the Y-axis direction.

The antenna elements illustrated in FIG. 4 and FIG. 5 each include a plurality of horizontal portions. In the case where the total element length of the plurality of horizontal portions is at least ¾ of the overall length L of the antenna element, the antenna as a whole has a simple shape elongated approximately horizontally. Especially in the case where the length of the longest horizontal portion 84C1, of the two horizontal portions 84C1 and 84C2 illustrated in FIG. 4, is at least ¾ of the overall length L of the antenna element 82C, the antenna 81C as a whole has a simple shape elongated approximately horizontally. Likewise, in the case where the length of the longest horizontal portion 84D1, of the two horizontal portions 84D1 and 84D2 illustrated in FIG. 5, is at least ¾ of the overall length L of the antenna element 82D, the antenna 81D as a whole has a simple shape elongated approximately horizontally. This makes it easy to ensure an area for disposing the antenna 81C or 81D, which is for receiving electromagnetic waves of AM broadcasting and FM broadcasting, on the glass plate 3 even in the case where the glass plate 3 has functional members such as a defogger, disposed thereon.

Figure 6:
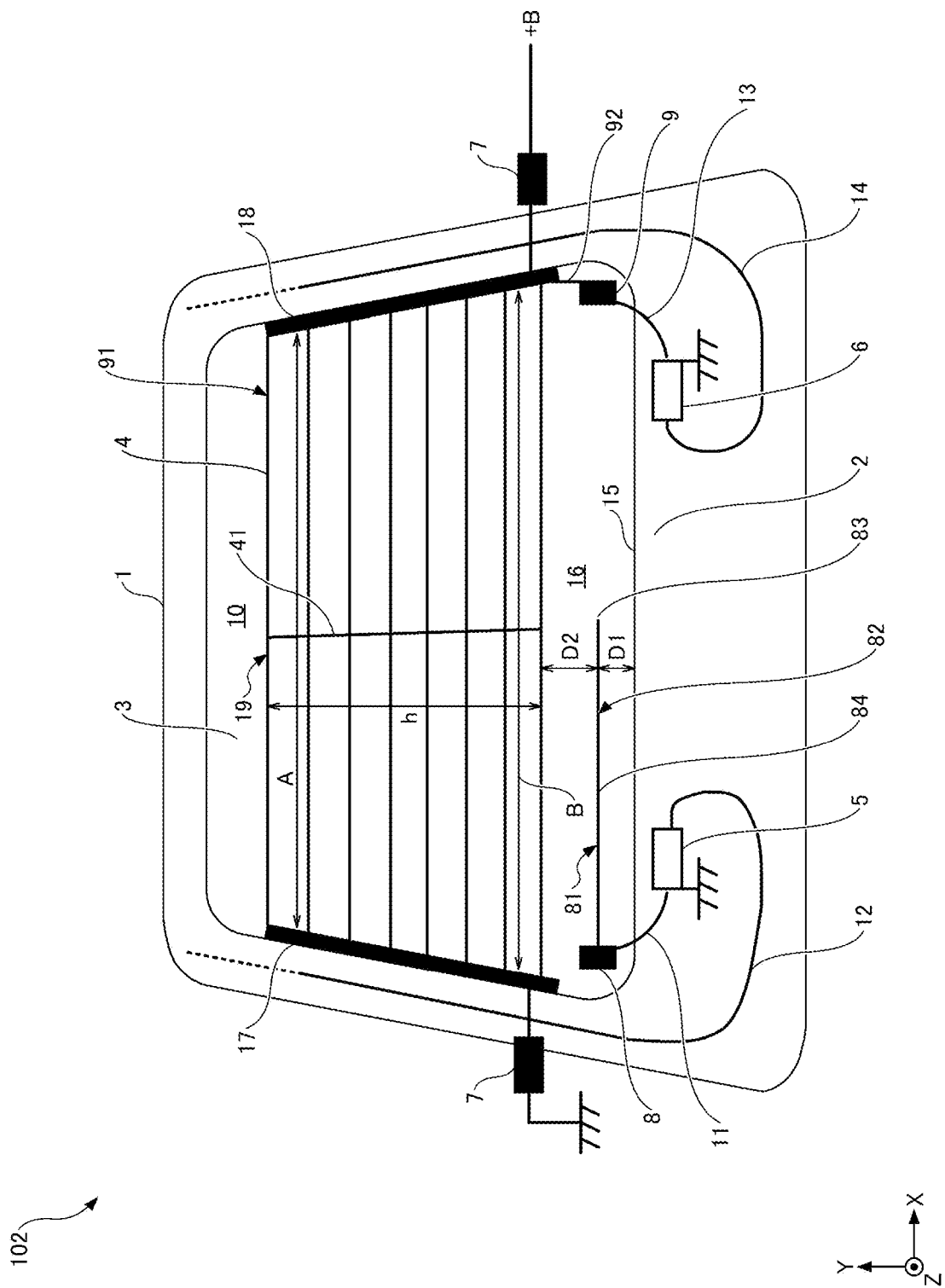
FIG. 6 is a plan view illustrating a configuration example of a window glass for vehicle according to a second embodiment.

FIG. 6 is a plan view illustrating a configuration example of a window glass for vehicle according to a second embodiment. With respect to the second embodiment, explanations on configurations and effects which are similar to those of the first embodiment are omitted by quoting the explanations given above. The window glass 102 illustrated in FIG. 6 is a rear window glass attached to the window frame 2 disposed in a rear portion of a vehicle. The window frame 2 has been formed, for example, in a rear door 1 attached to a rear portion of the vehicle in an openable/closable manner. The glass plate 3 of the window glass 102 is equipped with a defogger 19.

The defogger 19 is a conductor pattern that is heated by applying current, to defog the window glass 102. The defogger 19 includes: a plurality of heating wires 4 extending in the right-hand/left-hand direction of the window glass 102 (horizontal direction); and a plurality of bus bars 17 and 18 for feeding the plurality of heating wires 4. The plurality of heating wires 4 are heater wires extending side by side with each other in the right-hand/left-hand direction of the glass plate 3 (horizontal direction), and connect the first bus bar 17 to the second bus bar 18.

The first bus bar 17 is a strip electrode extending in the upside/downside direction from the upper end to the lower end and is a conductor having a larger width than the heating wires 4. The second bus bar 18 is a strip electrode disposed apart from the first bus bar 17 in the horizontal direction and extending in the upside/downside direction from the upper end to the lower end, and is a conductor having a larger width than the heating wires 4. Upon application of a voltage (+B) between the plurality of bus bars 17 and 18, the plurality of heating wires 4 generate heat due to the electric current, to thereby defog the glass plate 3.

The glass plate 3 has a blank area 10 lying over the defogger 19 and a blank area 16 lying below the defogger 19. In FIG. 6, an antenna 81 is disposed in the blank area 16. The antenna 81 has a simple shape elongated approximately in the horizontal direction and can hence be easily disposed in the relatively narrow blank area 16. The antenna 81 may be disposed in the blank area 10.

In the case where the antenna element 82 is disposed at a distance of longer than 20 mm from the defogger 19, the antenna element 82 shows lessened or no capacitive coupling with the defogger 19. Hence, AM broadcast wave signals which the antenna 81 has received are suppressed from leaking out to the defogger 19, resulting in an improvement in the antenna gain of the antenna 81 in the AM broadcast wave bond. In addition, vehicle noises having frequencies in the AM broadcast wave band can be suppressed from coming into the antenna 81 via the defogger 19. In the example illustrated in FIG. 6, the distance D2 between a horizontal portion 84 of the antenna element 82 and the lowermost heating wire 4 of the defogger 19, in the vehicle-mounted state C, is longer than 20 mm.

The distance D2 is preferably 25 mm or longer, more preferably 30 mm or longer, still more preferably 35 mm or longer, and especially preferably 40 mm or longer, from the standpoint of improving the antenna gain of the antenna 81 in the AM broadcast wave band. There is no particular upper limit on the distance D2 so long as areas for disposing functional members such as a defogger, and the antenna 81 can be ensured. For example, the distance D2 is 100 mm or less.

The voltage of the AM broadcast wave and FM broadcast wave received by the antenna 81 is inputted via an AV wire 11 to an amplifier 5, amplified, and inputted to a tuner (not illustrated) via a coaxial cable 12 such as an output feeder wire.

The glass plate 3 may be equipped with an antenna 91 for receiving the FM broadcast wave, besides the antenna 81, which receives both the AM and FM broadcast waves. The antenna 81 and the antenna 91 work as a diversity antenna for the FM broadcast wave. In the example illustrated in FIG. 6, the antenna 91 may utilize at least one heating wire 4 as an antenna conductor. Signals received by the antenna 91 may be taken out via a feeding portion 9 disposed in a blank area 16.

The feeding portion 9 may be disposed on the side opposite from the feeding portion 8 along the horizontal direction, and may be electrically connected to the bus bar 18 via a connecting wire 92. The first bus bar 17 and the second bus bar 18 extend in the upside/downside direction of the glass plate 3, and the plurality of heating wires 4 extend approximately horizontally in the vehicle-mounted state C. The glass plate 3 has at least one short-circuiting wire 41 which short-circuits the plurality of heating wires 4 in the upside/downside direction of the glass plate 3. FIG. 6 illustrates one short-circuiting wire 41 extending in the upside/downside direction through approximately center portions, along the horizontal direction, of the plurality of heating wires 4. The short-circuiting wire 41 can made the heating wires 4 themselves function as the antenna 91 for receiving the FM broadcast wave.

One short-circuiting wire 41 halves the horizontal-direction dimension (horizontal dimension) of the heating wires 4. In the case where the horizontal dimension of a portion of a heating wire 4 which extends from one bus bar to the short-circuiting wire 41 is about ¼ of an effective wavelength of the FM broadcast wave band on the glass plate 3, the heating wire 4 is apt to be tuned in the FM broadcast wave band and can hence be used as the antenna 91 for receiving the FM broadcast wave. The voltage of the FM broadcast wave received by the heating wire 4 (antenna 91) is inputted via an AV wire 13 into an amplifier 6, amplified, and inputted to a tuner (not illustrated) via a coaxial cable 14 such as an output feeder wire.

Coils 7 for attenuating signals having high frequencies in the FM broadcast wave band may be connected to the pair of bus bars 17 and 18 so that FM broadcast wave signals received by the antenna 81 or antenna 91 do not leak out from the pair of bus bars 17 and 18.

Figure 7:
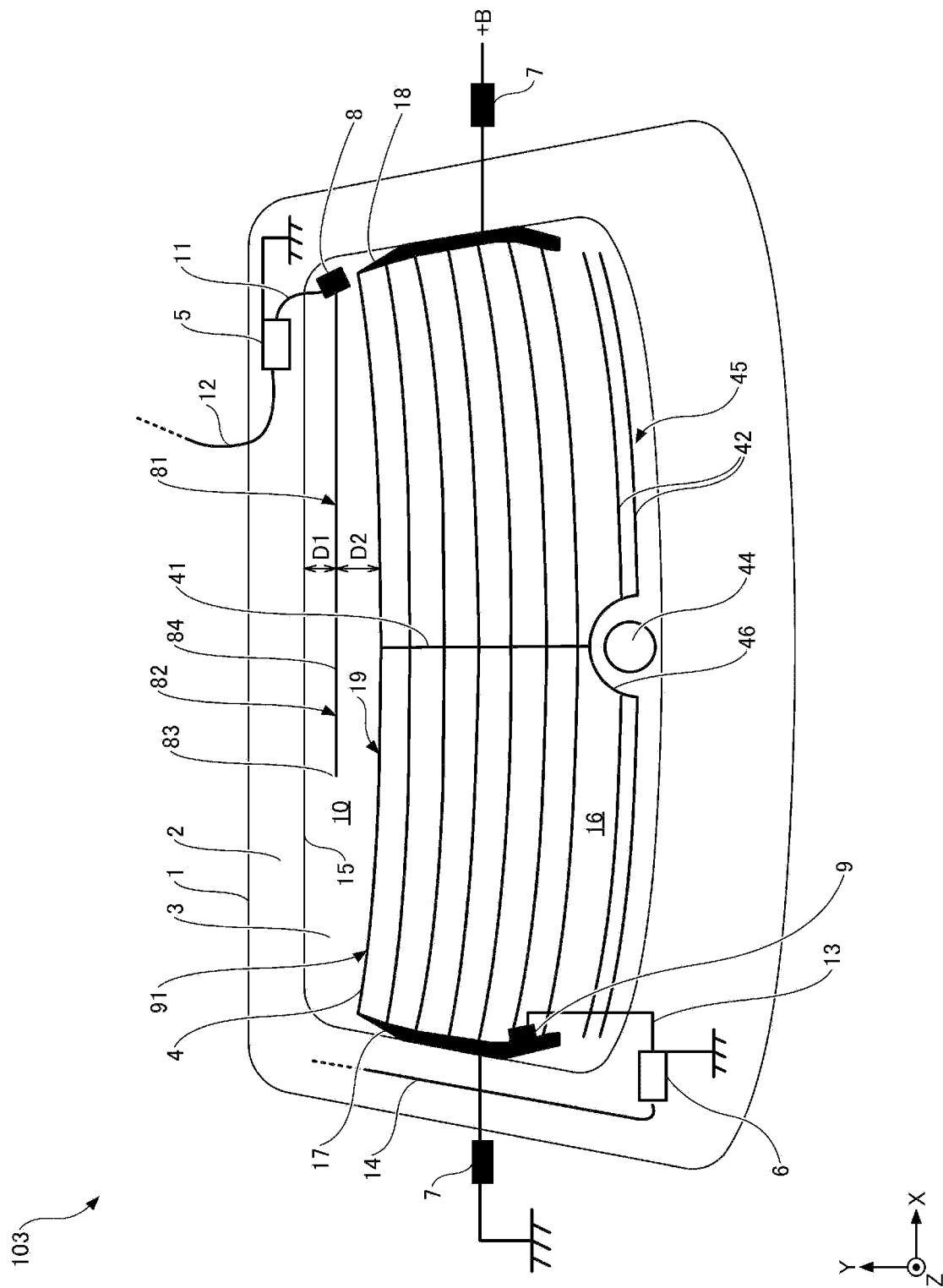
FIG. 7 is a plan view illustrating a configuration example of a window glass for vehicle according to a third embodiment.

FIG. 7 is a plan view illustrating a configuration example of a window glass for vehicle according to a third embodiment. With respect to the third embodiment, explanations on configurations and effects which are similar to those of the first and second embodiments are omitted by quoting the explanations given above. The window glass 103 illustrated in FIG. 7 is a rear window glass attached to the window frame 2 disposed in a rear portion of a vehicle.

In the third embodiment, the glass plate 3 has a wiper hole 44 in the blank area 16. Through the wiper hole 44 passes a rotating shaft of a wiper (not illustrated) for wiping off raindrops and the like from the outside surface of the window glass 103. The antenna 81 is disposed in the blank area 10 because a space for disposing the antenna 81 is difficult to ensure in the blank area 16 where the wiper is on standby and the wiper hole 44 has been formed.

The glass plate 3 has a T-shaped or L-shaped connecting element 45 connected to the defogger 19. In the example illustrated in FIG. 7, since the antenna 81 is disposed in the blank area 10, the connecting element 45 is disposed in the blank area 16, which lies on the side opposite from the antenna 81. The wiper hole 44 may be formed in the blank area 10 and, in this case, the antenna 81 may be formed in the blank area 16.

The connecting element 45 is connected to, for example, the lowermost heating wire 4 of the defogger 19, and preferably includes a portion which extends on an extension line of a short-circuiting wire 41 as illustrated in FIG. 7. The connecting element 45 includes: a circular-arc portion 46, which extends along the periphery of the wiper hole 44 so as to be separated from the wiper hole 44; and at least one linear element 42, which extends approximately horizontally from the circular-arc portion 46 on one or both sides thereof. The antenna gain of the antenna 91 in the FM broadcast wave band can be improved by regulating the length of the connecting element 45.

Figure 8:
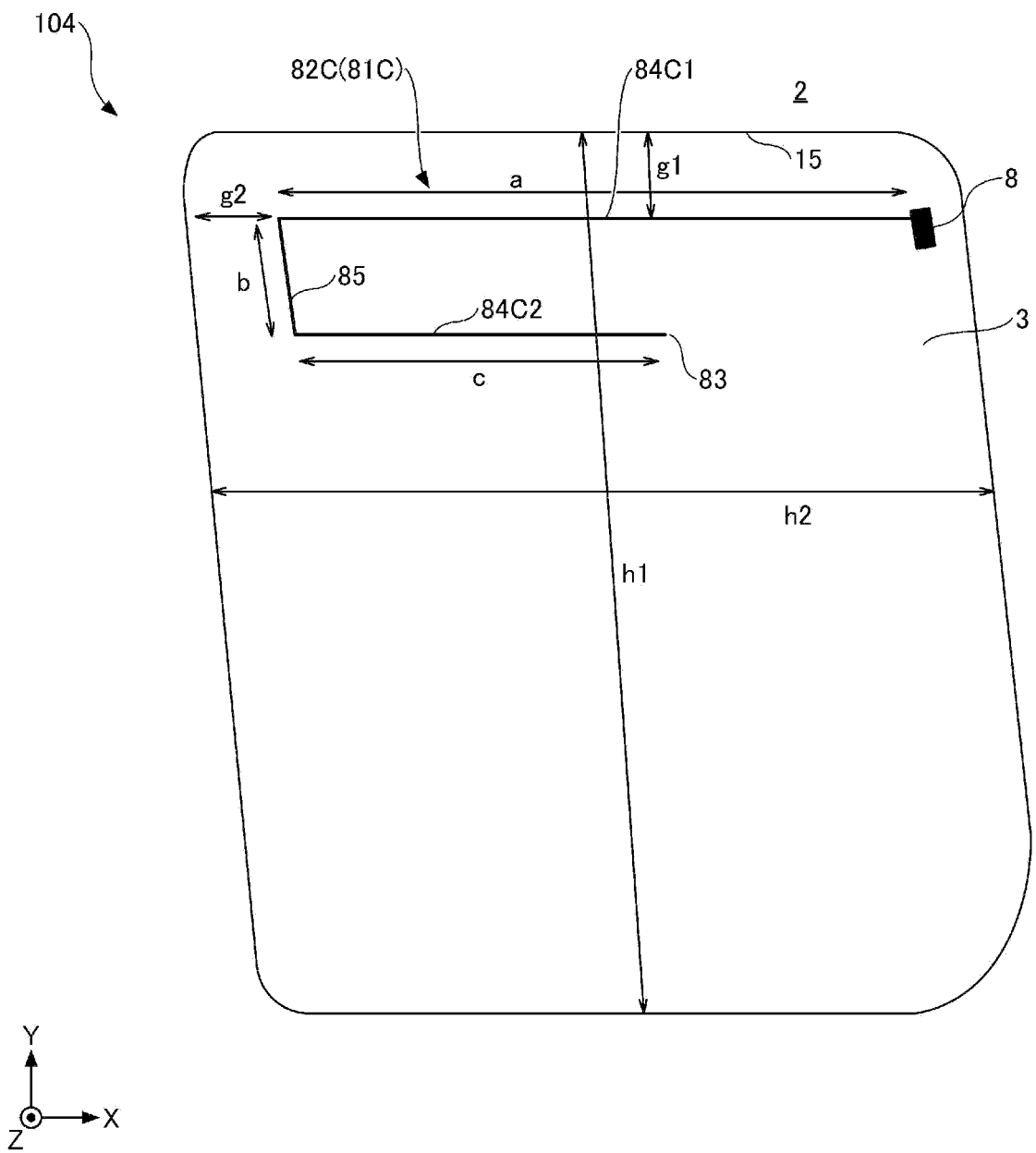
FIG. 8 is a plan view illustrating a configuration example of a window glass for vehicle according to a fourth embodiment.

FIG. 8 is a plan view illustrating a configuration example of a window glass for vehicle according to a fourth embodiment. With respect to the fourth embodiment, explanations on configurations and effects which are similar to those of the first and second embodiments are omitted by quoting the explanations given above. The window glass 104 illustrated in FIG. 8 is a side window glass attached to the window frame 2 disposed in a lateral side portion of a vehicle. The antenna 81C illustrated in FIG. 8 has a configuration which is reverse to that of the antenna illustrated in FIG. 4.

In the case where the antenna element 82C, in the vehicle-mounted state C, is disposed at a distance of longer than 20 mm from the metallic portion 15, the antenna element 82C shows lessened or no capacitive coupling with the metallic portion 15. Hence, AM broadcast wave signals which the antenna 81C has received are suppressed from leaking out to the metallic portion 15, resulting in an improvement in the antenna gain of the antenna 81C in the AM broadcast wave band. In addition, vehicle noises having frequencies in the AM broadcast wave band can be suppressed from coming into the antenna 81C via the metallic portion 15.

In the example illustrated in FIG. 8, the distance g1 between the horizontal portion 84C1 and the metallic portion 15 is longer than 20 mm and the distance g2 between the vertical portion 85 and the metallic portion 15 is longer than 20 mm, in the vehicle-mounted state C. The distance g1 and the distance g2 are each preferably regulated to the same dimensions as the distance D1. In the case where the window glass 104 illustrated in FIG. 8 is a side window glass as stated above, the horizontal-direction length thereof is, in many cases, shorter than that in the case of the rear window glass. Because of this, the antenna 81C may include a J-shaped or U-shaped antenna element 82C which extends from a feeding portion 8 and is elongated approximately in the horizontal direction. The overall length L of the antenna element 82C may be set at a value in the preferred range described above which brings about an improvement in antenna gain.

Figure 9:
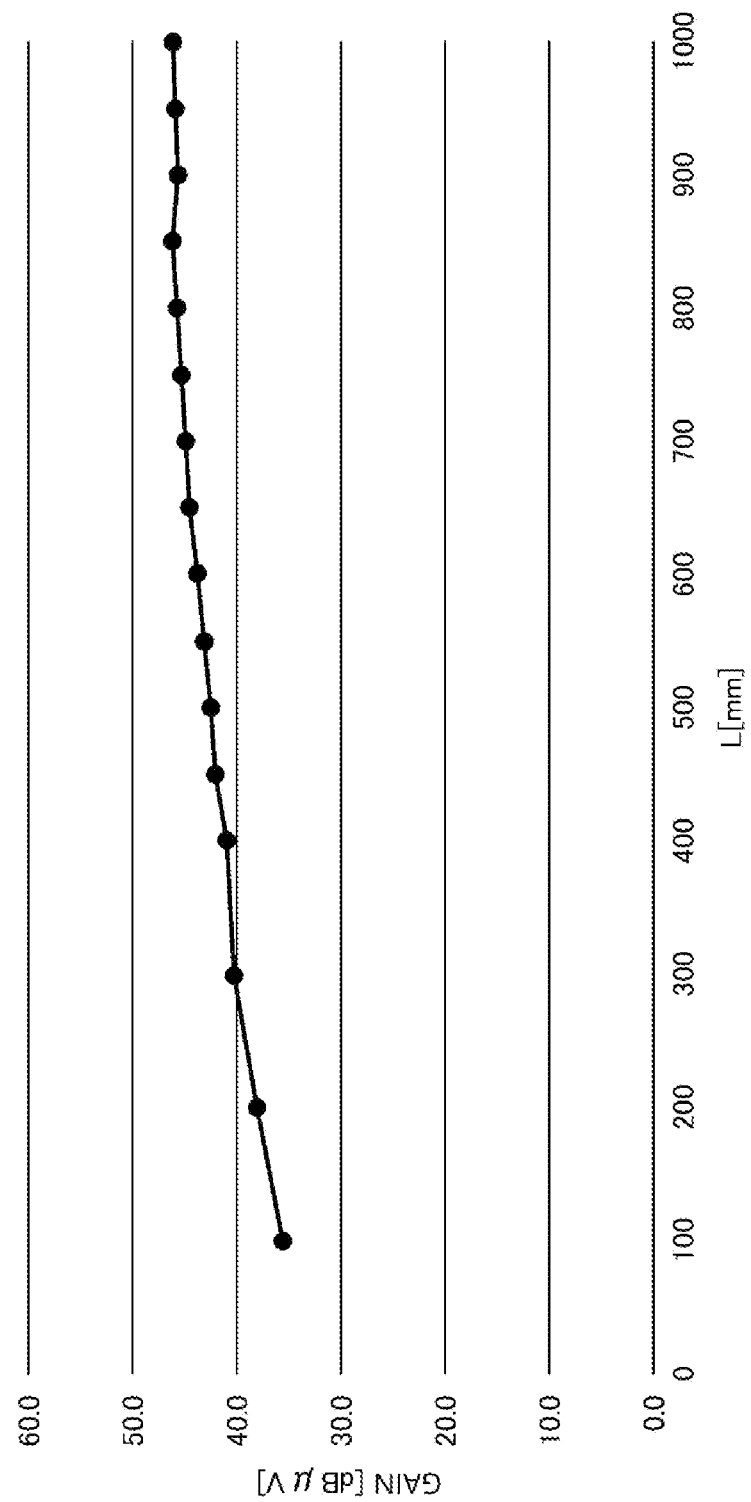
FIG. 9 is a diagram showing the results of an examination on a relationship between the overall length L of the antenna element 82 illustrated in FIG. 6 and antenna gain in the AM broadcast wave band.

FIG. 9 is a diagram showing the results of an examination on a relationship between the overall length L of the antenna element illustrated in FIG. 6 and antenna gain in the AM broadcast wave band. The antenna gain shown in FIG. 9 indicates the voltage measured, in the embodiment illustrated in FIG. 6, at the input terminal of a tuner (not illustrated) connected to the antenna 81 via the amplifier 5 and the coaxial cable 12. The values of antenna gain shown in FIG. 9 are each a value obtained by averaging antenna gains measured at a plurality of representative frequencies in the AM broadcast wave band.

The dimensions of portions illustrated in FIG. 6, in the examination for FIG. 9, were as follows.

Length A of uppermost heating wire 4: 960 mm
Length B of lowermost heating wire 4: 1,100 mm
Height h of defogger 19: 430 mm
Area occupied by the plurality of heating wires 4: 0.44 m$^2$
Distance D1: 30 mm
Distance D2: 40 mm As shown in FIG. 9, the obtained results indicate that the more the overall length L of the antenna element 82 is increased, the more the antenna gain in the AM broadcast wave band improves. Since the antenna element 82 is disposed in such an area that the antenna element 82 shows lessened or no capacitive coupling with the metallic portion 15 and the heating wires 4, received AM broadcast wave signals are suppressed from leaking out to the metallic portion 15 or the heating wires 4. It is hence thought that the more the overall length L of the antenna element 82 was increased, the more the receiving ability increased and the more the antenna gain in the AM broadcast wave band improved.

Figure 10:
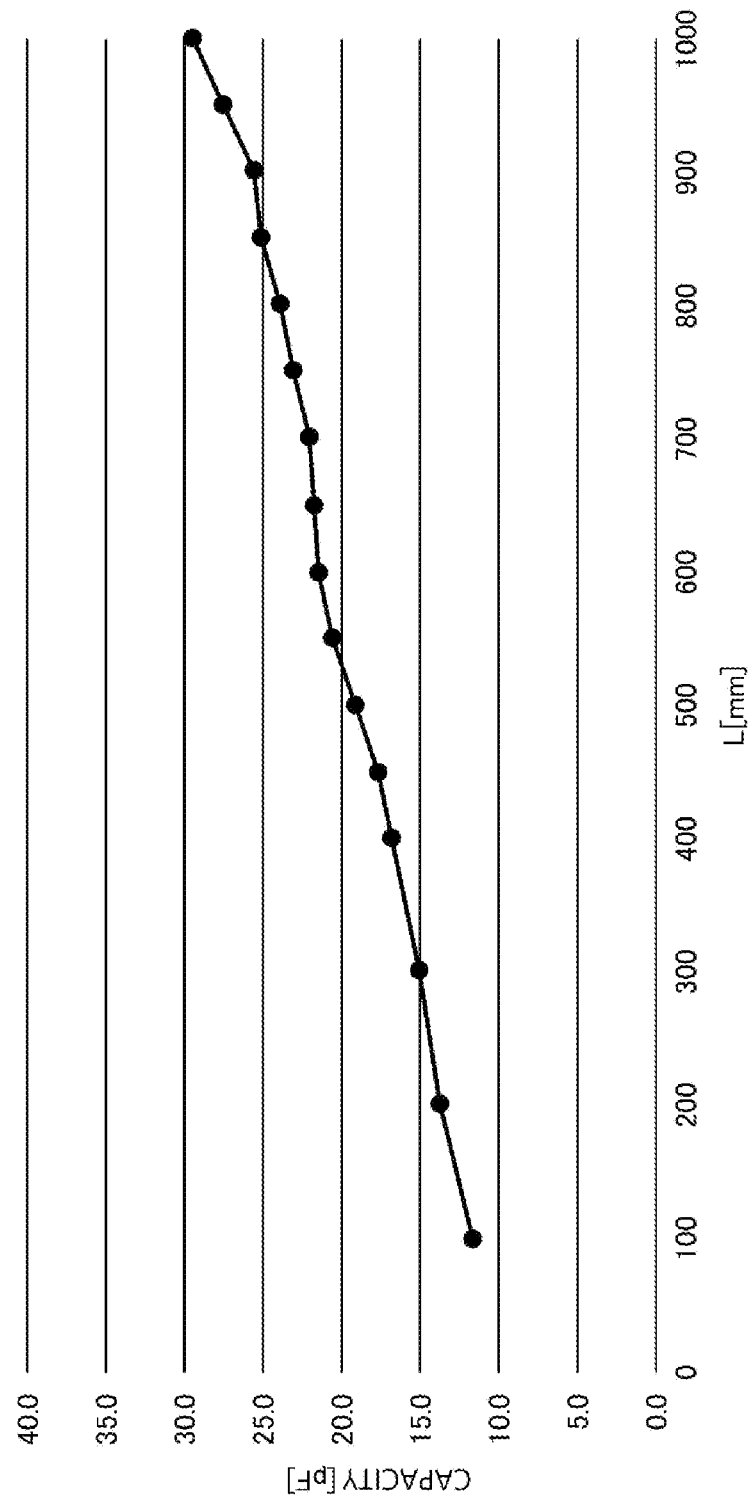
FIG. 10 is a diagram showing the results of an examination on a relationship between the overall length L of the antenna element 82 illustrated in FIG. 6 and the antenna capacity of the antenna element.

FIG. 10 is a diagram showing the results of an examination on a relationship between the overall length L of the antenna element illustrated in FIG. 6 and the antenna capacity of the antenna element. The values of antenna capacity shown in FIG. 10 are ones obtained by measuring the capacity between the feeding portion 8 of the antenna 81 and the vehicle body in the embodiment illustrated in FIG. 6. The dimensions of portions illustrated in FIG. 6, in the examination for FIG. 10, were the same as those mentioned above.

As shown in FIG. 10, the obtained results indicate that the more the overall length L of the antenna element 82 is increased, the more the antenna capacity in the AM broadcast wave band increases. Measured values of the antenna capacity were 11.6 pF when the overall length L was 100 mm and 29.4 pF when the overall length L was 1,000 mm. It is thought that increasing the overall length L resulted in an increase in the pattern length (pattern area) of the antenna element 82 and this resulted in an increase in the capacity of the antenna element 82 itself. The antenna element 82 is disposed approximately in the center, along the upside/downside direction (Y-axis direction), of the blank area 16 in order to make the capacitive coupling with the heating wires 4 or the metallic portion 15 weak or nil. Because of this, the antenna element 82 itself is thought to have had an increased capacity.

The measured values of antenna capacity (about 10 pF to 30 pF) shown in FIG. 10 were smaller than the antenna capacities (about 50 pF to 60 pF) of conventional rear-window-glass antennas. An antenna gain of 35 dBµV or higher (L=100 mm) was able to be ensured in an electric field of 60 dBµV/m by connecting the amplifier 5 to the antenna 81.

Figure 11:
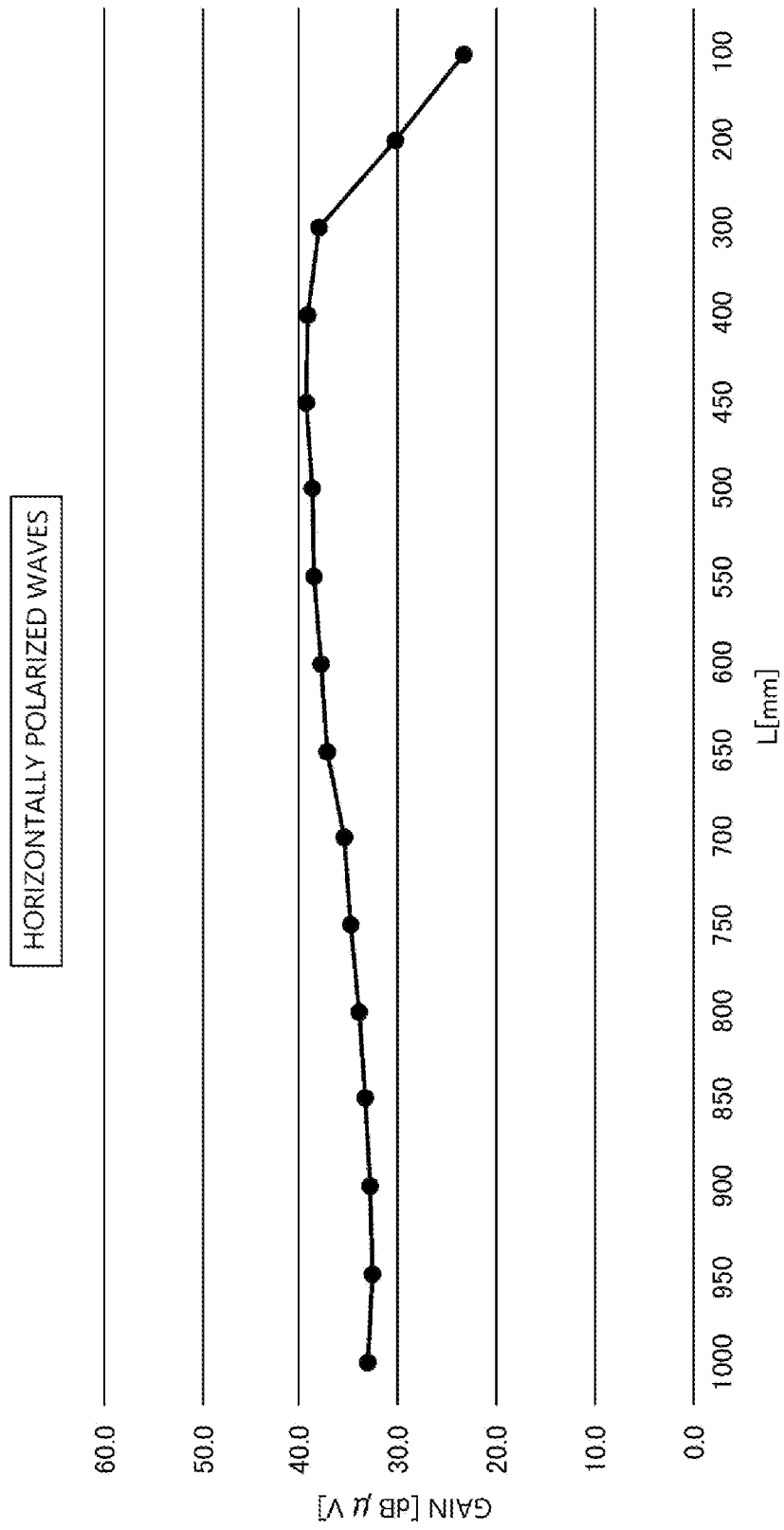
FIG. 11 is a diagram showing the results of an examination on a relationship between the overall length L of the antenna element 82 illustrated in FIG. 6 and antenna gain for horizontally polarized waves in the FM broadcast wave band.

FIG. 11 shows the results of an examination on a relationship between antenna gain in the FM broadcast wave band and the overall length L of the antenna element 82 in the antenna 81 which is receiving horizontally polarized waves. The values of antenna gain shown in FIG. 11 are each a value obtained by averaging antenna gains measured at a plurality of representative frequencies in the FM broadcast wave band. The dimensions of portions illustrated in FIG. 6, in the examination for FIG. 11, were the same as those mentioned above.

As shown in FIG. 11, the obtained results indicate that the values of antenna gain were mostly satisfactory when the overall length L of the antenna element 82 was in the range of 200 mm or longer and 1,000 mm or shorter, but that the antenna gain was low when the overall length L was less than 200 mm. The reduced antenna gain is thought to be attributable to that the overall length L was too short as compared with ¼ of the wavelength of the FM broadcast wave and the antenna hence had reduced receiving ability.

Figure 12:
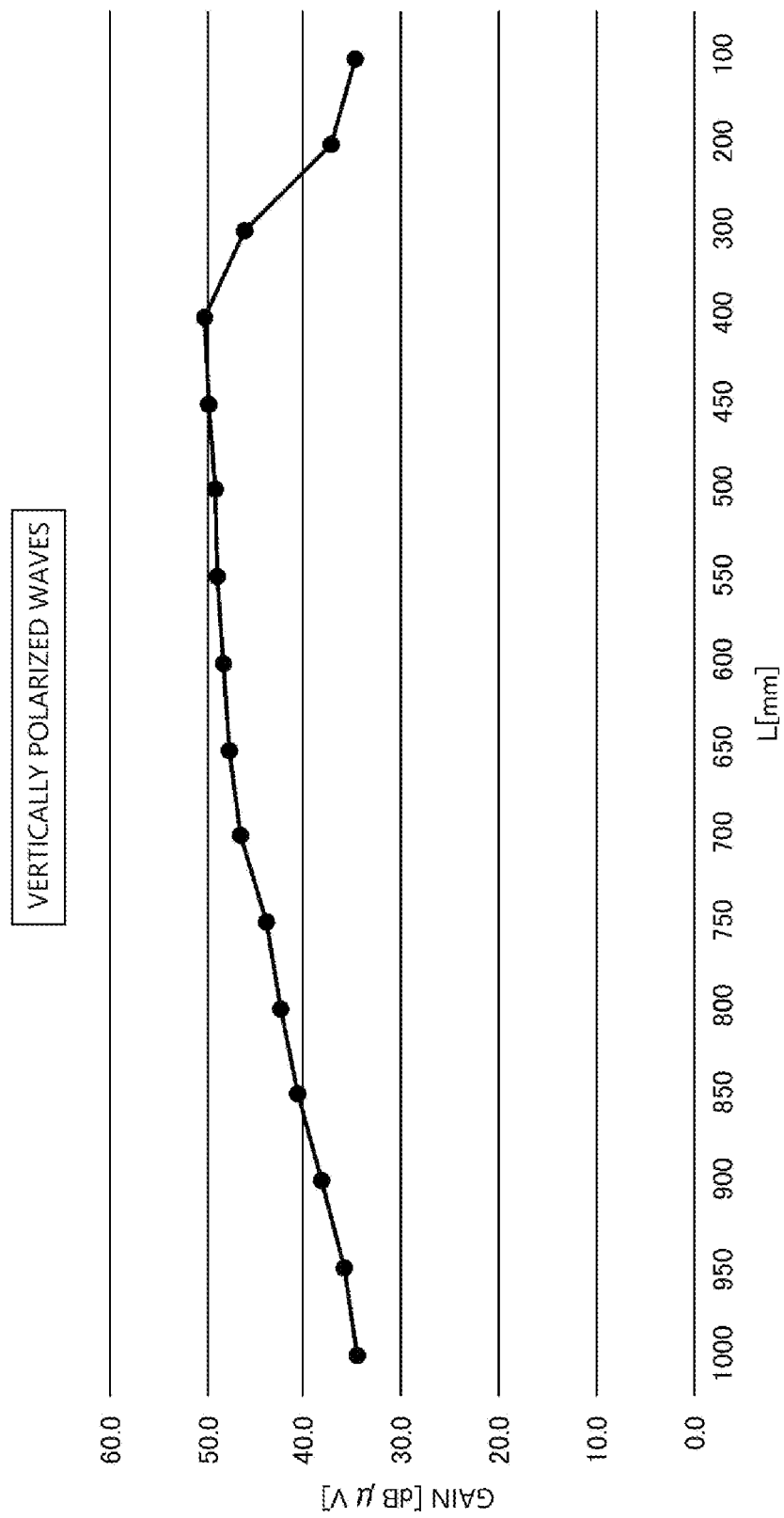
FIG. 12 is a diagram showing the results of an examination on a relationship between the overall length L of the antenna element 82 illustrated in FIG. 6 and antenna gain for vertically polarized waves in the FM broadcast wave band.

FIG. 12 shows the results of an examination on a relationship between antenna gain in the FM broadcast wave band and the overall length L of the antenna element 82 in the antenna 81 which is receiving vertically polarized waves. The values of antenna gain shown in FIG. 12 are each a value obtained by averaging antenna gains measured at a plurality of representative frequencies in the FM broadcast wave band. The dimensions of portions illustrated in FIG. 6, in the examination for FIG. 12, were the same as those mentioned above.

As shown in FIG. 12, the obtained results indicate that the values of antenna gain were mostly satisfactory when the overall length L of the antenna element 82 was in the range of 200 mm or longer and 1,000 mm or shorter, but that the antenna gain was low when the overall length L was less than 200 mm. The reduced antenna gain is thought to be attributable to that the overall length L was too short as compared with ¼ of the wavelength of the FM broadcast wave and the antenna hence had reduced receiving ability.

Figure 13:
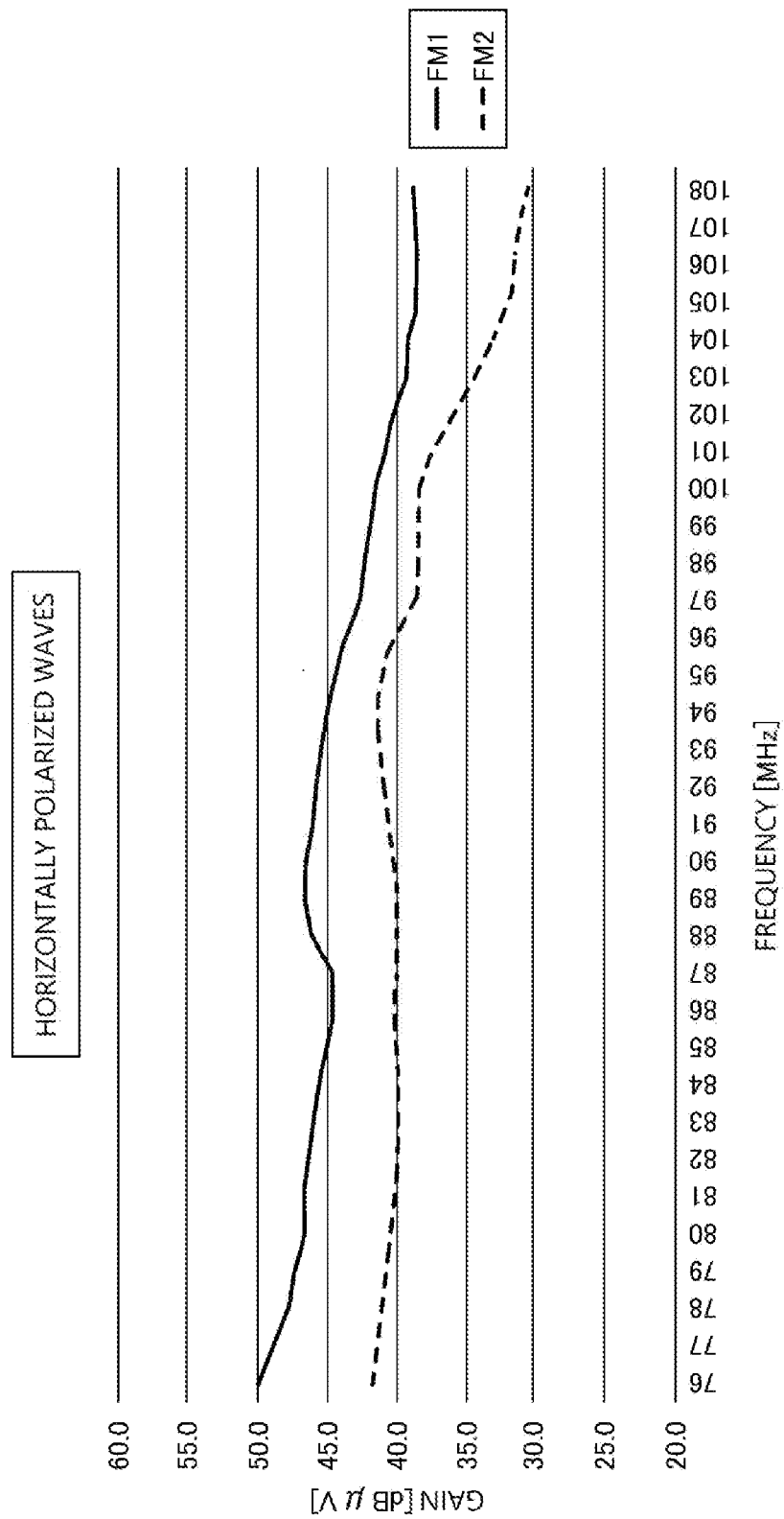
FIG. 13 is a diagram showing the results of an examination on the antenna-gain frequency characteristics of the diversity antenna illustrated in FIG. 6 in reception of horizontally polarized waves.
Figure 14:
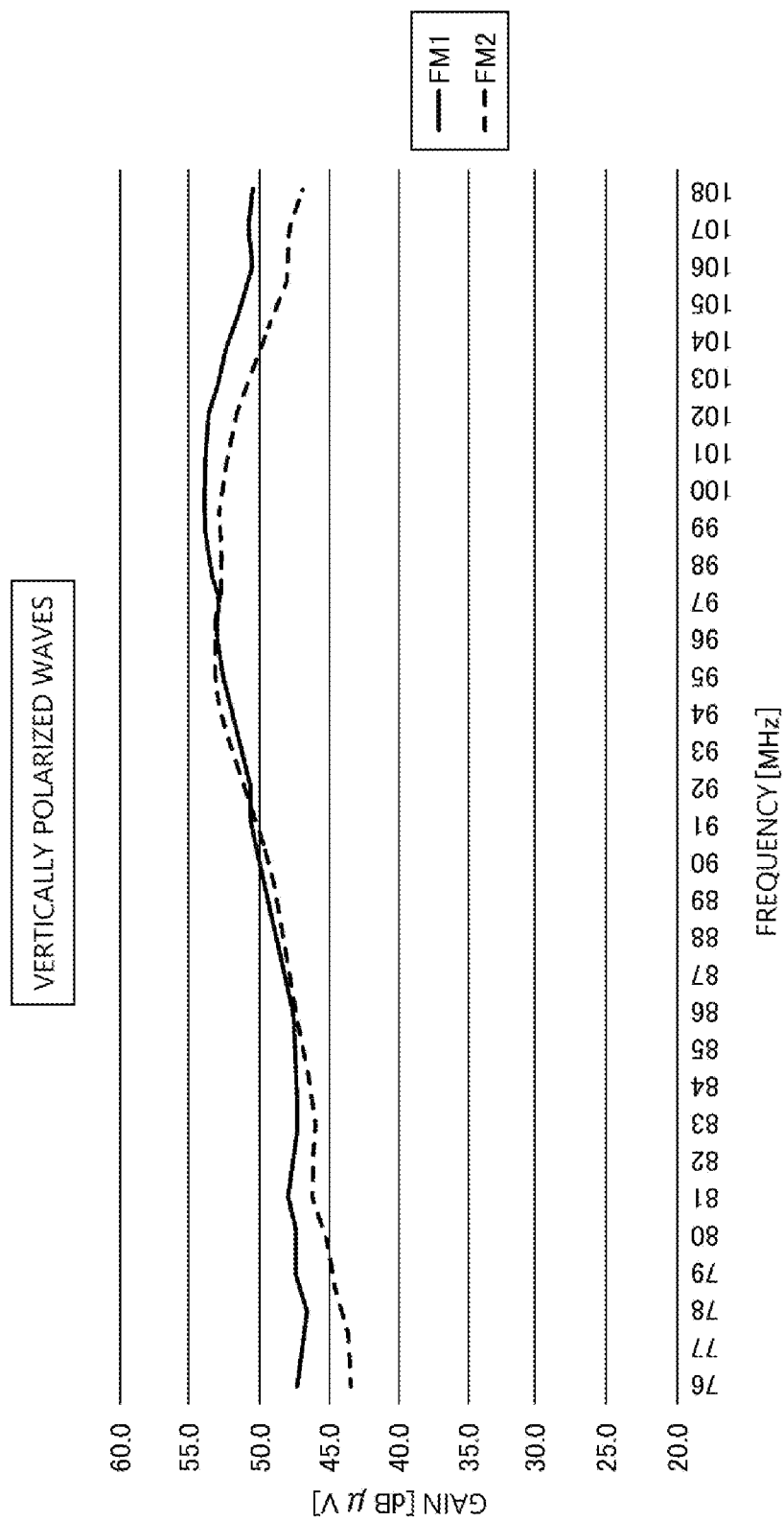
FIG. 14 is a diagram showing the results of an examination on the antenna-gain frequency characteristics of the diversity antenna illustrated in FIG. 6 in reception of vertically polarized waves.

FIG. 13 is a diagram showing the results of an examination on the antenna-gain frequency characteristics of a diversity antenna which includes the antenna 81 as FM2 and the antenna 91 as FM1 and is receiving horizontally polarized waves. FIG. 14 is a diagram showing the results of an examination on the antenna-gain frequency characteristics of the diversity antenna which includes the antenna 81 as FM2 and the antenna 91 as FM1 and is receiving vertically polarized waves.

The dimensions of portions illustrated in FIG. 6, in the examinations for FIG. 13 and FIG. 14, were the same as those mentioned above. However, the overall length L of the antenna element 82 was 550 mm. When the wavelength shortening ratio k of the glass plate 3 is taken as 0.64, the overall length L(=550 mm) is a value which satisfies the range of $0.38 \times (\lambda_0/4) \times k$ or longer and $1.92 \times (\lambda_0/4) \times k$ or shorter at the center frequency of the FM broadcast wave band.

FIG. 13 and FIG. 14 show that the difference in gain between the antenna 81 and the antenna 91 is within about 10 dB and the two antennas hence have a diversity effect.

Figure 15:
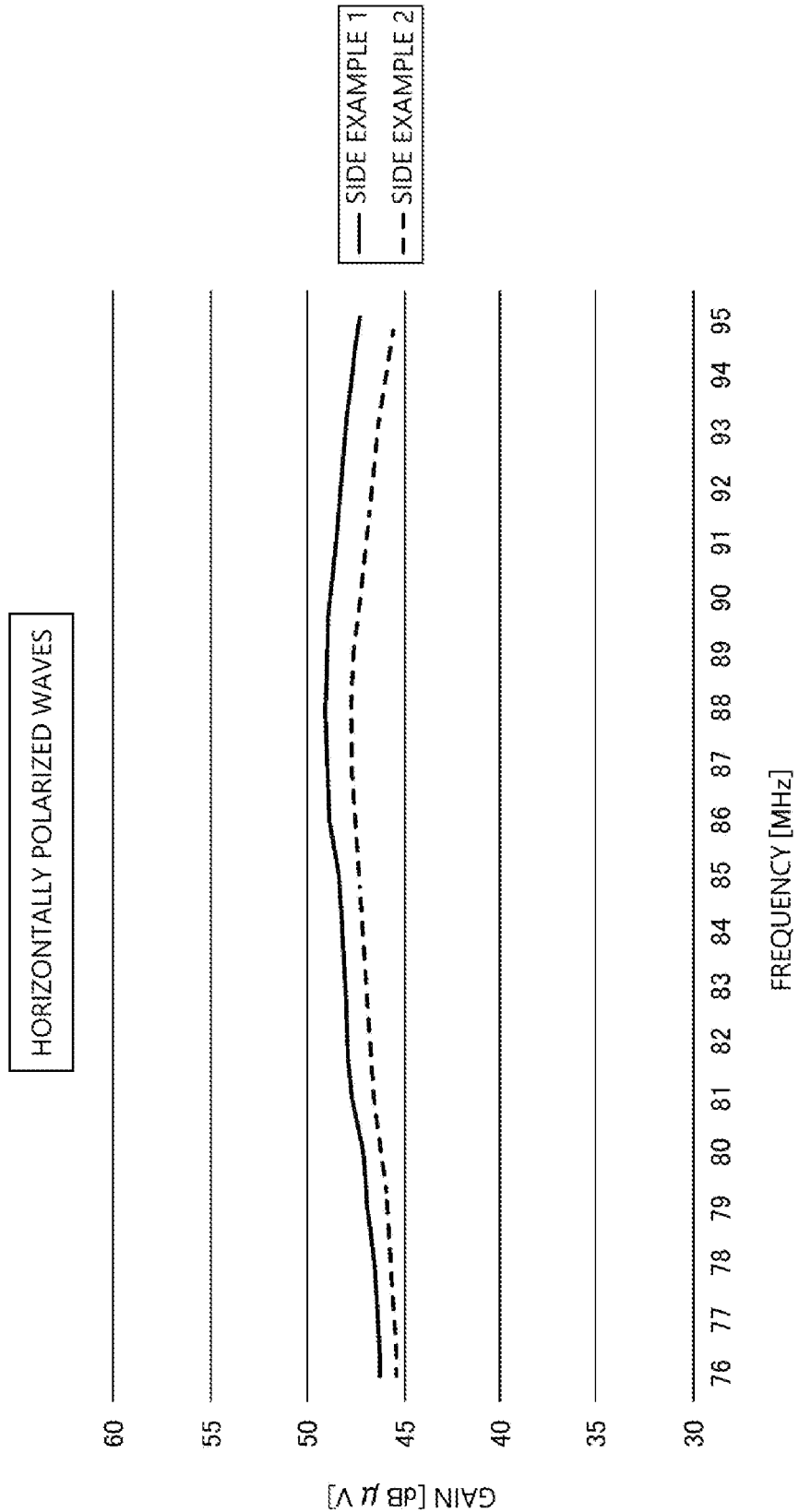
FIG. 15 is a diagram showing the results of an examination on the antenna-gain frequency characteristics of the antenna illustrated in FIG. 8 in reception of horizontally polarized waves.
Figure 16:
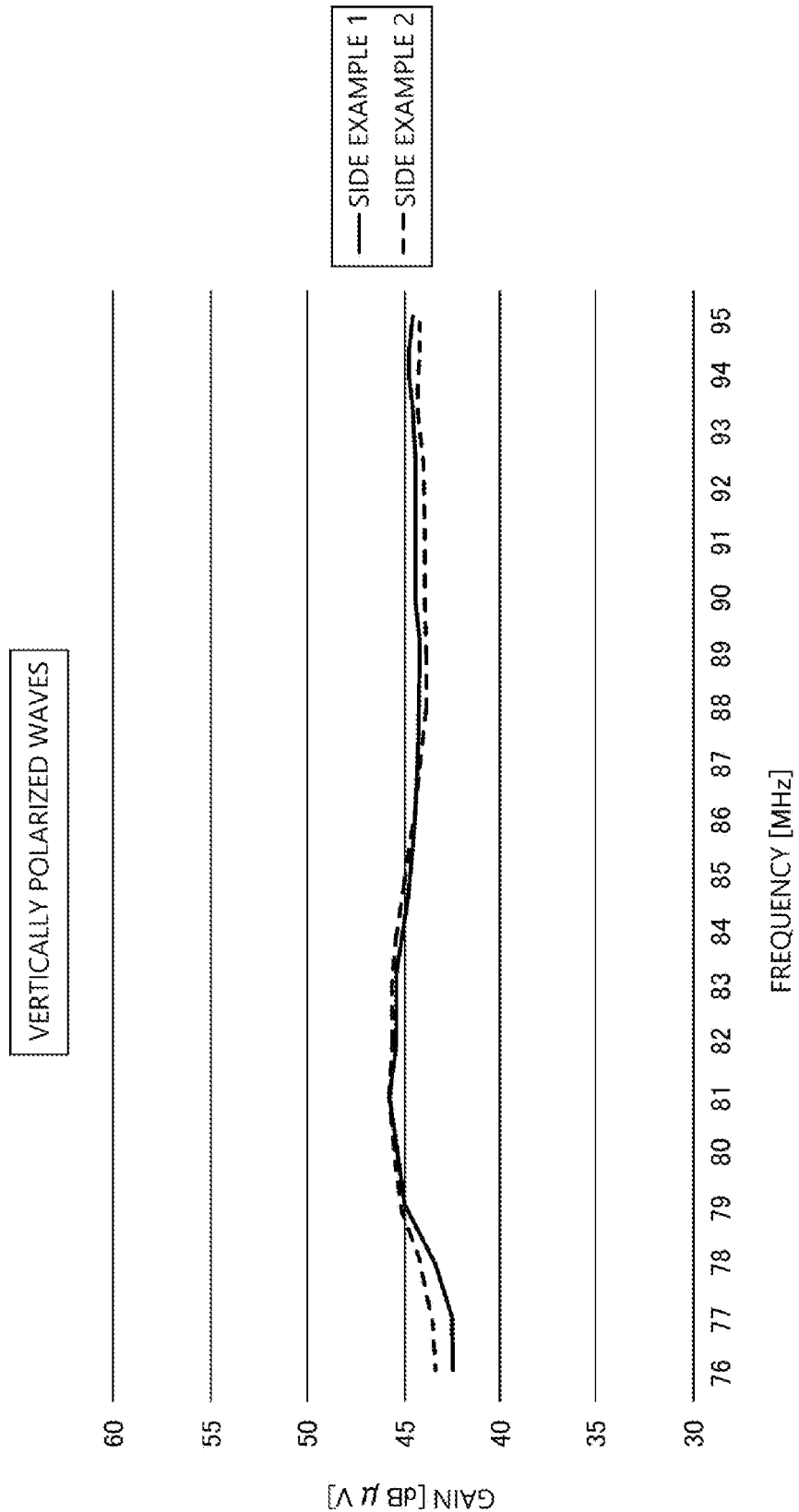
FIG. 16 is a diagram showing the results of an examination on the antenna-gain frequency characteristics of the antenna illustrated in FIG. 8 in reception of vertically polarized waves.

FIG. 15 is a diagram showing the results of an examination on the antenna-gain frequency characteristics of the antenna 81C illustrated in FIG. 8 which is receiving horizontally polarized waves. FIG. 16 is a diagram showing the results of an examination on the antenna-gain frequency characteristics of the antenna 81C illustrated in FIG. 8 which is receiving vertically polarized waves. The values of antenna gain shown in FIG. 15 and FIG. 16 are each a value obtained by averaging antenna gains measured at a plurality of representative frequencies in the FM broadcast wave band.

The dimensions of portions illustrated in FIG. 8, in the examination for "Side Example 1" in FIG. 15 and FIG. 16, were as follows.

h1: 430 mm
h2: 620 mm
g1: 50 mm
g2: 40 mm
a: 500 mm
b: 20 mm
c: 100 mm
L: 620 mm

The dimensions of portions illustrated in FIG. 8, in the examination for "Side Example 2" in FIG. 15 and FIG. 16, were as follows.

h1: 430 mm
h2: 480 mm
g1: 50 mm
g2: 40 mm
a: 360 mm
b: 60 mm
c: 250 mm
L: 670 mm

As shown in FIG. 15 and FIG. 16, the obtained results indicate that the antenna 81C, in each of the embodiments of "Side Example 1" and "Side Example 2", had a sufficient antenna gain of 40 dBµV or higher in the FM broadcast wave band in an electric field of 60 dBµV/m. Furthermore, the embodiments of "Side Example 1" and "Side Example 2" each gave results which, although not especially shown in the figures, indicated that the antenna 81C had a sufficient antenna gain of 49 dBµV or higher on average in the AM broadcast wave band in an electric field of 60 dBµV/m. Thus, results indicating that AM broadcast and FM broadcast waves can be received with high gain even with simple antenna patterns, such as that of the antenna 81C, were obtained.

While embodiments have been described above, the present invention is not limited to the embodiments and can be variously modified or improved, for example, by combining any of the embodiments with a part or whole of another embodiment or replacing a part of any of the embodiments by a part or whole of another embodiment.

REFERENCE NUMERALS AND SIGNS

1 Rear door
2 Window frame
3 Glass plate
4 Heating wire
5, 6 Amplifier
7 Coil
8, 9 Feeding portion
10, 16 Blank area
11, 13 AV wire
12, 14 Coaxial cable
15 Metallic portion
17, 18 Bus bar
19 Defogger
41 Short-circuiting wire
42 Linear element
44 Wiper hole
45 Connecting element
46 Circular-arc portion
81 Antenna
82 Antenna element
83 Open end
84 Horizontal portion
85, 86 Vertical portion
91 Antenna
92 Connecting wire
101, 102, 103, 104 Window glass

What is claimed is:

1. A window glass for vehicle, comprising:
a glass plate and
an antenna provided to the glass plate and capable of receiving electromagnetic waves of AM broadcasting and FM broadcasting, wherein
the antenna comprises an antenna element and a feeding portion electrically connected to the antenna element,
the antenna element lies at a distance of longer than 20 mm from a metallic portion of the vehicle when the glass plate is in a vehicle-mounted state where the glass plate has been attached to a vehicle,
the antenna element comprises at least one horizontal portion extending in an approximately horizontal direction in the vehicle-mounted state,
the horizontal portion has an open end or has a bent portion bending apart therefrom which has an open end, and
the horizontal portion has a total element length that is at least ¾ of an overall length of the antenna element, wherein the window glass further comprises an amplifier having a regulated gain connected to the feeding portion of the antenna and wherein the antenna element has a capacity of 5 pF or higher and 30 pF or lower in a frequency range of 500 kHz to 1,500 kHz connected to an input terminal of the amplifier, wherein said antenna is the only antenna on the window glass.

2. The window glass for vehicle according to claim 1, wherein the antenna element is a linear element and the number of the open end is one.

3. The window glass for vehicle according to claim 1, wherein
the antenna element comprises a plurality of horizontal portions each extending in an approximately horizontal direction in the vehicle-mounted state, and
a longest horizontal portion has a length of at least ¾ of the overall length of the antenna element.

4. The window glass for vehicle according to claim 1, wherein the overall length of the antenna element is 0.38×($\lambda_0$/4)×k or longer and 1.92×($\lambda_0$/4)×k or shorter, when $\lambda_0$ represents a wavelength in an FM broadcast wave frequency band in air, and k represents a wavelength shortening ratio of the glass plate.

5. The window glass for vehicle according to claim 4, wherein the $\lambda_0$ represents a wavelength at a center frequency in the FM broadcast wave frequency band in air.

6. The window glass for vehicle according to claim 1, wherein the overall length of the antenna element is 200 mm or longer and 1,000 mm or shorter.

7. The window glass for vehicle according to claim 1, wherein the antenna element is a straight-line element extending linearly approximately horizontally in the vehicle-mounted state.

8. The window glass for vehicle according to claim 1, wherein
the bent portion bending apart from the horizontal portion is a return portion comprising a vertical portion extending approximately vertically in the vehicle-mounted state, and
the vertical portion lies at a distance of longer than 20 mm from the metallic portion of the vehicle in the vehicle-mounted state.

9. The window glass for vehicle according to claim 1, wherein the window glass is a side window glass.

10. The window glass for vehicle according to claim 1, wherein
the glass plate comprises a defogger,
the defogger comprises a first bus bar, a second bus bar, and a plurality of heating wires connecting the first bus bar to the second bus bar, and
the antenna is disposed in a first blank area over or below the defogger.

11. The window glass for vehicle according to claim 10, wherein the antenna element is disposed at a distance of longer than 20 mm from the defogger.

12. The window glass for vehicle according to claim 10, wherein
the first bus bar and the second bus bar each extends in an upside/downside direction of the glass plate,
the plurality of heating wires each extends approximately horizontally in the vehicle-mounted state, and
the glass plate further comprises at least one short-circuiting wire that short-circuits the plurality of heating wires in the upside/downside direction of the glass plate.

13. The window glass for vehicle according to claim 12, wherein
the glass plate further comprises a T-shaped or L-shaped connecting element, and
the connecting element is connected to the defogger and is disposed in a second blank area that lies on a side opposite from the antenna.

14. The window glass for vehicle according to claim 13, wherein
the glass plate further comprises a wiper hole through which a rotating shaft of a wiper passes, in the second blank area, and
the connecting element comprises a portion extending along a periphery of the wiper hole so as to be separated from the wiper hole.

* * * * *